United States Patent
Räsänen et al.

(10) Patent No.: US 9,988,765 B2
(45) Date of Patent: Jun. 5, 2018

(54) PROCESS FOR PRODUCING AT LEAST ONE PLY OF A PAPER OR PAPERBOARD PRODUCT AND A PAPER OR PAPERBOARD PRODUCT

(71) Applicant: STORA ENSO OYJ, Helsinki (FI)

(72) Inventors: Jari Räsänen, Imatra (FI); Janne Pynnönen, Lempäälä (FI)

(73) Assignee: Stora Enso OYJ, Helsinki (FI)

(*) Notice: Subject to any disclaimer, the term of this patent is extended or adjusted under 35 U.S.C. 154(b) by 0 days. days.

(21) Appl. No.: 15/318,132

(22) PCT Filed: Jun. 11, 2015

(86) PCT No.: PCT/IB2015/054427
§ 371 (c)(1),
(2) Date: Dec. 12, 2016

(87) PCT Pub. No.: WO2015/189800
PCT Pub. Date: Dec. 17, 2015

(65) Prior Publication Data
US 2017/0121913 A1    May 4, 2017

(30) Foreign Application Priority Data
Jun. 13, 2014    (SE) ........................... 1450734

(51) Int. Cl.
| | |
|---|---|
| *D21H 27/30* | (2006.01) |
| *B32B 29/00* | (2006.01) |
| *D21C 9/00* | (2006.01) |
| *D21H 11/16* | (2006.01) |
| *D21H 27/10* | (2006.01) |

(52) U.S. Cl.
CPC ........... *D21H 27/30* (2013.01); *B32B 29/005* (2013.01); *D21C 9/00* (2013.01); *D21C 9/007* (2013.01); *D21H 11/16* (2013.01); *D21H 27/10* (2013.01); *B32B 2250/26* (2013.01); *B32B 2307/73* (2013.01)

(58) Field of Classification Search
CPC ........ D21H 27/30; D21H 11/16; D21H 27/10; B32B 29/005; B32B 2250/26; B32B 2307/73; D21C 9/00; D21C 9/007
USPC ....................................... 428/537.5
See application file for complete search history.

(56) References Cited

U.S. PATENT DOCUMENTS

| | | | | |
|---|---|---|---|---|
| 4,431,479 A | * | 2/1984 | Barbe ..................... | D21C 9/007 162/100 |
| 5,709,774 A | * | 1/1998 | Naieni .................... | A61L 15/28 162/100 |
| 2005/0016698 A1 | * | 1/2005 | Stoyanov ............ | D06M 13/123 162/9 |

FOREIGN PATENT DOCUMENTS

| | | | |
|---|---|---|---|
| EP | 0511186 | * | 10/1992 |
| EP | 0511186 A1 | | 10/1992 |
| EP | 1132516 | * | 9/2001 |
| EP | 1132516 A1 | | 9/2001 |
| WO | 0151702 A1 | | 7/2001 |
| WO | WO0151702 | * | 7/2001 |

OTHER PUBLICATIONS

International Search Report for PCT/IB2015/054427, dated Sep. 14, 2015.

* cited by examiner

*Primary Examiner* — Leszek Kiliman
(74) *Attorney, Agent, or Firm* — Greer, Burns & Crain Ltd.

(57) ABSTRACT

The present invention relates to a process for producing at least one ply of a paper or paperboard product which process comprises the steps of; subjecting cellulosic fibers to heat treatment wherein the fibers are treated at a high dry content and at an increased temperature, preparing a slurry comprising said heat treated fibers, forming a web of said slurry and, dewatering said web whereby a ply of said product is formed. The present invention further relates to a paper or paperboard product produced according to the process.

18 Claims, No Drawings

PROCESS FOR PRODUCING AT LEAST ONE PLY OF A PAPER OR PAPERBOARD PRODUCT AND A PAPER OR PAPERBOARD PRODUCT

This application is a U.S. National Stage under 35 U.S.C. § 371 of International Application No. PCT/IB2015/054427, filed Jun. 11, 2015, which claims priority to Swedish application No. 1450734-7 filed Jun. 13, 2014.

FIELD OF INVENTION

The present invention relates to a process for producing at least one ply of a paper or paperboard product wherein the at least one ply comprises heat treated fibers. The invention also relates to a paper or paperboard product that comprises at least one ply wherein said ply has been produced according to the process.

BACKGROUND

During papermaking processes there is a desire to obtain strong paper and board products but yet with a high bulk (low density). The advantage with high bulk products is that these products require smaller amounts of fibers, which is economically favorable. Furthermore, high bulk board products with low fiber content have better bending stiffness which is an advantage during creasing and forming of packages from the board product.

In order to increase the bulk of a product, pulp comprising long fibers and as little fine material as possible should be used. However, pulps that are rich in stiff, long fibers unfortunately show poor ability to produce sufficient strong paper or board products. The bulk and strength properties of the resulting paper or board will therefore be a compromise between the ability of the pulp to increase the bulk and its ability to increase the fiber bonding properties, i.e. strength, of the paper or board.

A common way to produce a high bulk product is to use of chemi-mechanical pulp (CTMP) in the product, preferably in the midply of a multiply paper or board product. Also, mechanical fibers can be used in order to increase the bulk of a product.

One way to increase the fiber bonding properties of mechanical pulps is by addition of chemical additives to the pulp. The predominant treatment for improving the strength, particularly dry strength, of paper or board has so far been to add cationic starch to the pulp fiber slurry prior to the sheet forming operation. It is however difficult to adsorb large amounts of starch to the fibers, especially when the fines amount is small.

Another way to increase the bulk in a multiply paper or board product is described in EP0511186A1. A slurry comprising cellulosic fibers that has been heat treated is used for the production of a product with reduced density (i.e. decreased bulk) but still with good stiffness and bending ability. The slurry is treated at an elevated temperature of 200-240° C., for a period of 0, 1-10 minutes and at a dry content of 3-4%. However, this is a very energy consuming process since it takes a lot of energy to heat the water present in the slurry.

Thus, there is still a need for an improved process for production of a paper or board product with increased bulk but still with good strength properties.

SUMMARY OF INVENTION

The main object of the present invention is to provide a process for the production of at least one ply of a paper or board product with increased bulk in an improved way.

Another object of the present invention is to provide a paper or board product with increased bulk.

These objects, as well as other objects and advantages, is achieved by the process according to claim 1 and by the product according to claim 5. The present invention relates to a process for producing at least one ply of a paper or paperboard product which process comprises the steps of:

subjecting cellulosic fibers to heat treatment wherein the fibers are treated at a dry content of above 95% by weight and at a temperature of between 160-230° C., preparing a slurry comprising said heat treated fibers, forming a web of said slurry and, dewatering said web whereby a ply of said product is formed.

The present invention further relates to a process for producing at least one ply of a paper or paperboard product which process comprises the steps of:

subjecting cellulosic fibers to heat treatment wherein the fibers are treated at a dry content of above 70% by weight, at a temperature of above 120° C. and at an increased pressure, preparing a slurry comprising said heat treated fibers, forming a web of said slurry and, dewatering said web whereby a ply of said product is formed.

It was found that the use of cellulosic fibers that has been subjected to a high temperature treatment at high dry contents, in a paper or board product makes it possible to produce a product with improved bulk and remained strength properties and improved hydrophobic properties.

It may be preferred that the treatment of the fibers is done for a period of at least 30 seconds.

It may be preferred that the slurry comprises 1-100% by weight, preferably above 50% by weight, of heat treated fibers. Depending on the desired properties of the end product produced, the amount of heat treated fibers may vary.

The present invention further relates to a paper or paperboard product comprising at least one first ply wherein said first ply is produced according to the process described above.

It may be preferred that the product further comprises a second and a third ply and wherein said first ply is located in between said second and third ply. In this way a three-ply product is formed and the midply comprised fibers that have been heat treated according to the process described above.

The first ply may comprise 1-100%-by weight, preferably above 50% by weight, of heat treated fibers, i.e. of fibers that has been treated at an elevated temperature, at high dry content as described above.

It may also be preferred that all plies of the product are produced according to the process as described above.

DETAILED DESCRIPTION OF THE INVENTION

It has been surprisingly been found that by heat treating cellulosic fibers and thereafter using the heat treated fibers in the production of a paper or paperboard product, it is possible to produce a product with increased bulk without reducing the strength of the product. Above all the bending stiffness of the product is good in relation to the bulk.

Furthermore, another big advantage with the present invention is that the heat treated fibers has improved hydrophobic properties, i.e. they tend to adsorb less water compared to untreated fibers. This is big advantage when producing paper or paperboard products since cellulosic fibers tend to adsorb water and the strength of the produce then strongly decreased. Normally, sizing agents, e.g. AKD, ASA or rosin, is added in order to give the paper or paperboard product improved water resistance. By the present invention it is thus possible to reduce or even eliminate the amount of sizing agent needed by adding heat treated fibers instead. Consequently, the product comprising heat treated fibers will have both environmental and economic benefits due to the reduced or eliminated amount of sizing agents needed in order to achieve the desired water resistance.

The present invention relates to a process for producing at least one ply of a paper or paperboard product which process comprises the steps of:

subjecting cellulosic fibers to heat treatment wherein the fibers are treated at a dry content of above 95% by weight, and at a temperature of between 160-230° C., and preferably at atmospheric pressure, preparing a slurry comprising said heat treated fibers, forming a web of said slurry and, dewatering said web whereby a ply of said product is formed.

It may be preferred that the dry content of the fibers during heat treatment at atmospheric pressure is 100% by weight.

The present invention further relates to a process for producing at least one ply of a paper or paperboard product which process comprises the steps of:

subjecting cellulosic fibers to heat treatment wherein the fibers are treated at a dry content of above 70% by weight, at a temperature of above 120° C. and at an increased pressure, preferably of a pressure between 1-13 bar, preparing a slurry comprising said heat treated fibers, forming a web of said slurry and, dewatering said web whereby a ply of said product is formed.

It may be preferred that the dry content of the fibers during heat treatment at increased pressure is above 95% by weight.

It was found that the use of cellulosic fibers that has been subjected to a high temperature treatment at high dry contents, in a paper or board product makes it possible to produce a product with improved bulk, remained strength properties and with improved hydrophobic properties. It is possible to both heat treat the fibers at atmospheric pressure or at increased pressure. Depending on the method used, the dry content of the fibers may also differ. When heat treating the fibers at increased pressure the dry content of the fibers may preferably be a bit lower, it should be above 70% by weight, preferably above 80% by weight and even more preferably above 95% by weight. At the same time the temperature should be above 120° C. However, if the heat treatment is done at atmospheric pressure the dry content of the fibers may be higher, it should be above 95% by weight and the dry content could preferably be 100% by weight. Also, the temperature used when treating the fibers at atmospheric pressure should be between 160-230° C.

Depending on the equipment at hand and on the fibers to be treated, the appropriate process for heat treating the fibers can be chosen. It may be possible to use a flash dryer, impregnation vessels or other equipment suitable for subjecting fibers to increased temperature and pressure (if used). The increased temperature may be achieved by any known method, e.g. by the use of steam or merely by the use of heating.

The heat treatment may be a batch or a continuous process. It depends on the equipment used. However, in a full scale production process a continuous process is more favorable.

The time needed to the fibers to be heat treated depends on the moisture content of the fibers being treated, on the specific fibers treated, on the equipment used and on the temperature and pressure used. It may be preferred that the treatment of the fibers are done for a period of at least 30 seconds, preferably between 30 seconds to 10 hours, even more preferably between 30 seconds and 30 minutes. If the fibers need to be treated for a longer period of time it might be necessary to change the atmosphere that the fibers are exposed to during the heat treatment. Too oxygen rich atmosphere might cause burning of the fibers if the temperature and time of the heat treatment is too long. It may then be possible to add nitrogen or other gases to the atmosphere. Thus the treatment may be done in for example nitrogen rich atmosphere in order avoid burning of the fibers.

It may be preferred that the dry content of the fibers after the heat treatment is 100%. However, the dry content may also be lower, i.e. above 96%.

After the heat treatment the treated fibers are added to a slurry. The slurry is thereafter formed to a web which is dewatered in order to form a ply of the paper or paperboard product. The preparation of the slurry, the formation of the slurry to a web and the dewatering of said web in done according to normal papermaking processes used today.

It may be preferred that the slurry comprises 1-100% by weight, preferably above 50% by weight, more preferably between 5-40% by weight of heat treated fibers. Depending on the desired properties of the end product produced, the amount of heat treated fibers may vary.

The present invention further relates to a paper or paperboard product comprising at least one first ply wherein said first ply is produced according to the process described above. In this way a paper or paperboard produce with improved hydrophobic properties, improved bulk and remained strength may be produced.

It may be preferred that the product further comprises a second and a third ply and wherein said first ply is located in between said second and third ply. In this way a three-ply product is formed and the midply comprised fibers that have been heat treated according to the process described above.

The first ply may comprise 1-100%-by weight, preferably above 50% by weight, even more preferably between 5-40% by weight of heat treated fibers, i.e. of fibers that has been treated at an elevated temperature, at high dry content as described above.

It may also be preferred that all plies of the product are produced according to the process as described above.

The cellulosic fibers being heat treated may be any kind of fibers both hardwood, e.g. birch, eucalyptus, aspen, and softwood fibers, e.g. pine or spruce. The fibers may be produced by any kind of pulping process, e.g. mechanical pulping, chemimechanical pulping, chemithermomechanical pulping (CTMP) and/or chemical pulping processes. The fibers is preferably virgin fibers, however recycled fibers may also be treated.

The slurry may comprise additional cellulosic fibers, i.e. fibers that have not been subjected to any heat treatment. These fibers may also be of any kind of fibers, both hardwood and/or softwood fibers. The fibers may also have been produced by any known pulping process, such as mechanical pulping, chemimechanical pulping, CTMP and/ or chemical pulping processes. The fibers may also be virgin or recycled cellulosic fibers. The slurry may additional comprise other commonly used papermaking chemicals, such as strength additives, sizing agents, retention aids etc.

EXAMPLE

Different kraft pulps were used for testing the heat treatment according to the invention. The heat treated samples were treated in a heating chamber at different temperatures for a period of 4 hours in nitrogen rich atmosphere at atmospheric pressure.

Two samples comprising birch kraft pulp were used. One birch sample was heat treated at a temperature of 190° C. and the other birch sample was left untreated and used as a reference sample.

Three samples comprising pine kraft pulp were used. One pine sample was heat treated at a temperature of 190° C. and another pine sample were heat treated at a temperature of 210° C. The third pine sample was left untreated and used as a reference sample.

The dry content of the pulp samples before the heat treatment was 95% by weight.

TABLE 1

Bulk and humidity tests of heat treated fibers

| Sample | Bulk (cm3/g) | Humidity 50% RH |
|---|---|---|
| Ref Birch | 1.50 | 6.33 |
| Birch 190° C. | 2.22 | 4.94 |
| Ref Pine | 1.69 | 6.55 |
| Pine 190° C. | 2.20 | 5.33 |
| Pine 210° C. | 2.24 | 4.91 |

Table 1 shows that the bulk of the heat treated fibers is increased. Furthermore, the humidity of the heat treated fibers is decreased which shows that the heat treated fibers has reduced tendency to adsorb water.

The bulk was calculated via the grammage and thickness of the samples. The grammage was measured according to ISO 536 (gsm) and the thickness according to ISO 534 (micrometer). The humidity was measured according to ISO 287.

It should be understood that the embodiments given in the description and in the examples above are for illustrative purposes only, and that various changes and modifications are possible within the scope of the invention.

The invention claimed is:

1. A process for producing at least one ply of a paper or paperboard product which process comprises the steps of:
    subjecting cellulosic fibers to heat treatment wherein the fibers are treated at a dry content of above 95% by weight and at a temperature of between 160-230° C.,
    preparing a slurry comprising said heat treated fibers,
    forming a web of said slurry and,
    dewatering said web whereby a ply of said paper or paperboard product is formed.

2. A process for producing at least one ply of a paper or paperboard product which process comprises the steps of:
    subjecting cellulosic fibers to heat treatment wherein the fibers are treated at a dry content of above 70% by weight, at a temperature of above 120° C. and at an increased pressure,
    preparing a slurry comprising said heat treated fibers,
    forming a web of said slurry and,
    dewatering said web whereby a ply of said product is formed.

3. The process according to claim 1 wherein the treatment of the fibers are done for a period of at least 30 seconds.

4. The process according to claim 1 wherein the slurry comprises 1-100% by weight of heat treated fibers.

5. A paper or paperboard product comprising at least a first ply wherein said first ply is produced according to the process of claim 1.

6. The paper or paperboard product according to claim 5 wherein the product further comprises a second and a third ply and wherein said first ply is located in between said second and third ply.

7. The paper or paperboard product according to claim 5 wherein the first ply comprises 1-100%-by weight of heat treated fibers.

8. The paper of paperboard product according to claim 5 wherein all plies of the product are produced according to the process of claim 1.

9. The process according to claim 1 wherein the slurry comprises above 50% by weight of heat treated fibers.

10. The paper or paperboard product according to claim 5 wherein the first ply comprises above 50% by weight of heat treated fibers.

11. The process according to claim 2 wherein the treatment of the fibers are done for a period of at least 30 seconds.

12. The process according to claim 2 wherein the slurry comprises 1-100% by weight of heat treated fibers.

13. A paper or paperboard product comprising at least a first ply wherein said first ply is produced according to the process of claim 2.

14. The paper or paperboard product according to claim 13 wherein the product further comprises a second and a third ply and wherein said first ply is located in between said second and third ply.

15. The paper or paperboard product according to claim 13 wherein the first ply comprises 1-100% by weight of heat treated fibers.

16. The paper of paperboard product according to claim 13 wherein all plies of the product are produced according to the process of claim 2.

17. The process according to claim 2 wherein the slurry comprises above 50% by weight of heat treated fibers.

18. The paper or paperboard product according to claim 13 wherein the first ply comprises above 50% by weight of heat treated fibers.

* * * * *